May 30, 1933.   R. T. STEINDORF   1,912,019
SEDIMENT REMOVER FOR SETTLING TANKS
Filed Nov. 2, 1931
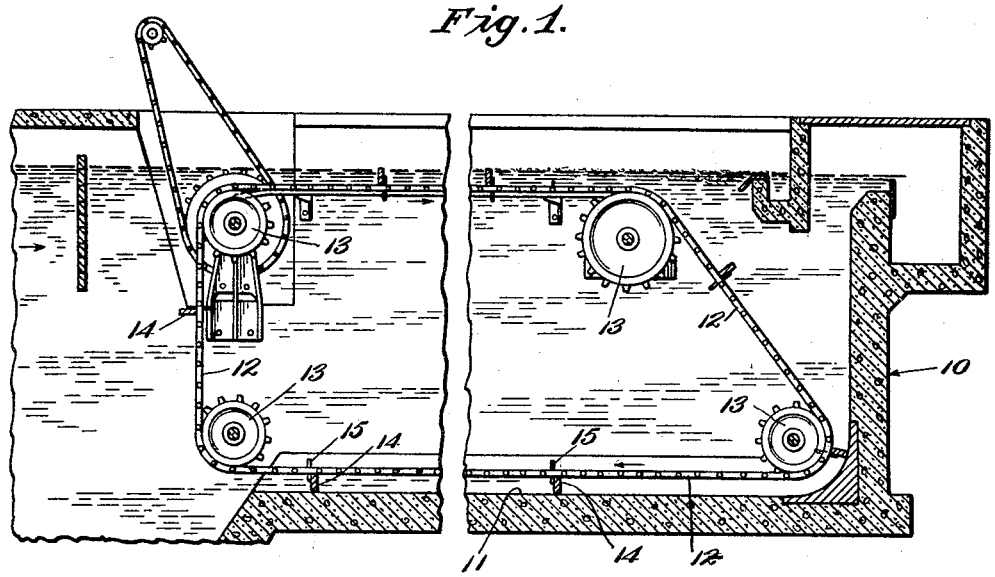
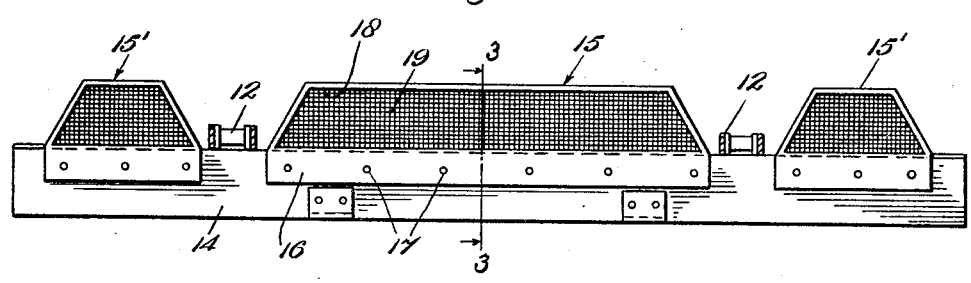
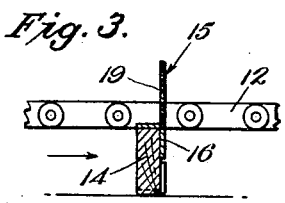 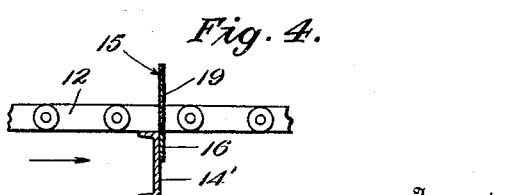
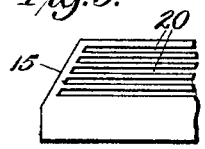 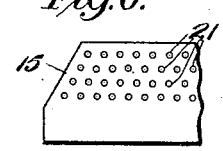
Inventor
Robert T. Steindorf,
By
Barker & Collings
Attorneys Patented May 30, 1933

1,912,019

UNITED STATES PATENT OFFICE

ROBERT T. STEINDORF, OF MILWAUKEE, WISCONSIN, ASSIGNOR TO CHAIN BELT COMPANY, OF MILWAUKEE, WISCONSIN, A CORPORATION OF WISCONSIN

SEDIMENT REMOVER FOR SETTLING TANKS

Application filed November 2, 1931. Serial No. 572,696.

This invention relates to sediment removers for settling tanks and has for one of its objects to improve certain of the apparatus of this character which have been heretofore proposed.

In the separation of flocculent solids suspended in liquids, as for example in sewage disposal apparatus, it is common to provide power driven mechanism for removing the solids from the bottoms of the settling tanks, one form of which comprises endless chains trained about suitable sprockets and carrying transverse wooden or metal flights, which during their lower run scrape over the bottom of the tank, pushing the sludge before them and moving it into a sump at one end of the tank from which it is removed in various ways. Such solids have a density little exceeding that of water (approximately 1.01) and are therefore subject to being easily disturbed and resuspended in the liquid from which they have settled through relatively slight agitation. It has been found in actual practice that when such solids have flocced and settled, if they are distrubed and redistributed through the carrying liquid, they require a considerably longer time to resettle than they do in the first instance. It is therefore important to prevent so far as possible all agitation of the settled solids in order that the additional time required for resettling be not made necessary.

While the sediment removers above described move relatively slowly over the tank bottoms they of necessity set up some eddy currents in the liquid and as the accumulated solids pile up before the flights and tend to flow over the tops thereof such eddy currents pick up the solids and redistribute them more or less through the liquid. On the other hand, if such settled solids as tend to flow over the top of the flights can be caught and screened from these eddy currents, as it were, their resuspension may be prevented, and the efficiency of the apparatus materially increased. Furthermore, the liquid immediately adjacent the tops of the flights also contains solids which are settling from above, and if the solids in this portion of the liquid can be collected as the flights travel through it, the action of the sludge removing mechanism will be rendered still more efficient.

It is the primary object of the present invention therefore to provide means whereby those settled solids tending to move over the tops of the sludge removing flights, as well as those immediately adjacent such flights which are still in the process of settling, may be collected and prevented from returning in suspension in the liquid, to the end that the capacity for sludge removal may be greatly increased.

With the above and other objects in view which will appear as the description proceeds, the invention consists in the novel details of construction and combinations of parts more fully hereinafter described and particularly pointed out in the appended claims.

Referring to the accompanying drawing forming a part of this specification in which like reference characters designate like parts in all the views:—

Figure 1 is a longitudinal sectional view, partly broken away, of a settling tank such as is commonly employed in sewage disposal systems with one form of sediment removing apparatus provided with the present invention shown therein;

Figure 2 is a transverse elevational sectional view on an enlarged scale through a portion of the sediment removing apparatus showing one of the flights and its supporting chains, the said flight being provided with one form of sediment collecting and thickening means constructed in accordance with the present invention;

Figure 3 is a transverse sectional view taken approximately on the plane indicated by the line 3—3 of Figure 2, looking in the direction of the arrows, the flights in this instance being of the wooden type;

Figure 4 is a view similar to Figure 3, showing the thickening element carried by metallic flights of channel construction; and Figures 5 and 6 are fragmentary elevational views showing slightly modified forms of the thickening member.

Referring more particularly to the said drawing the settling tank 10, which is usually constructed of concrete, is provided with the floor or sediment receiving surface 11 and with the sediment removing mechanism comprising the endless chains 12 passing around the sprockets 13 and carrying the scrapers or flights 14, all as is well known in the art. Secured to each flight 14 is one or more baffle members 15 which, as shown in Figures 2 and 3, may comprise the substantially rigid framework 16 which may be stamped from sheet metal, or constructed in any other suitable manner, and which is secured to the flight by suitable bolts or fastenings 17. The said framework, as clearly shown, projects materially above the edge of the flight and this projecting portion is provided with an opening 18 which in this form is shown as being covered by any suitable reticulated fabric 19 such for example as wire mesh. The said mesh may be secured in any suitable manner to the framework as for example by welding, or by suitable clamping strips.

In some instances the supporting chains 12 are disposed some distance from the end of the flights as shown in Figure 2, in which case there may be provided the relatively long central baffle 15 between the chains, and the relatively shorter end baffles 15' outside the chains, and adjacent the flight ends. The spaces between the baffles 15 and 15' not only accommodate the chains 12, but also the sprockets 13, as the chains pass around them, as will be readily understood. In other instances where the chains 12 are located in close proximity to the ends of the flights the baffle 15 may of course be lengthened and the baffles 15' omitted.

The flights 14 are ordinarily constructed of wooden beams as shown in Figures 2 and 3 but in some cases they take the form of channel irons shown at 14' in Figure 4.

Instead of the wire mesh fabric shown in Figures 2, 3 and 4 the baffles 15 and 15' may take the form of sheet metal plates having longitudinal slots or openings 20 as shown in Figure 5 and obviously if desired these openings may be vertical instead of horizontal. The same result may be accomplished by welding spaced horizontal or vertical bars across the opening 18 of the framework 16. Likewise the openings may take the form of spaced holes 21 of circular or other shape, which may be stamped or drilled in the plates as shown in Figure 6.

It has been found from actual practice that provision of means such as baffles 15 upon the flights of the sludge removers has the tendency to not only prevent the sludge which piles up in front of the flights from flowing over the top thereof and being redistributed through the liquid but also to collect those solids which are settling downward and which have almost reached the surface 11, thereby thickening the sludge which is being removed. Of course the water in which these downwardly moving solids is suspended passes through the openings, such as the spaces in the fabric 19 or the apertures 20 and 21 of the forms shown in Figures 5 and 6. These constructions set up no additional eddy currents and have been found to greatly increase the efficiency of these sludge removers.

It is obvious that those skilled in the art may vary the details of construction as well as the precise arrangement of parts without departing from the spirit of the invention, and therefore it is not wished to be limited to the above disclosure except as may be required by the claims.

What I claim is:

1. In sediment removers for settling tanks and the like, having a movable member for removing the settled solids, the combination of apertured means movable with said member for thickening the sediment adjacent thereto and preventing its redistribution in the liquid.

2. In sediment removers for settling tanks and the like, having a movable member for removing the settled solids, the combination of a perforated baffle movable with said member for thickening the sediment adjacent thereto and preventing its redistribution in the liquid.

3. In sediment removers for settling tanks and the like, having a member movable over the solid-collecting surface of the tank to remove the settled solids therefrom, the combination of a screening element projecting beyond said member for thickening the sediment adjacent thereto, and preventing its resuspension in the liquid.

4. In sediment removers for settling tanks and the like, having a member movable over the floor of the tank to scrape the settled solids therefrom, the combination of a reticulated baffle carried by and projecting upwardly from said member for thickening the sediment adjacent thereto, and preventing its redistribution in the liquid.

5. In sediment removers for settling tanks and the like, having a member movable over the floor of the tank to remove the settled solids therefrom, the combination of a substantially rigid open frame secured to and projecting above said member; and a reticulated fabric secured to said frame over its opening.

6. In apparatus for removing flocculent settled solids from settling tanks and the like, having a movable member for removing said solids, the combination of screening means movable with said member for preventing the breaking up of the floc and redistribution of the solids in the carrying liquid.

In testimony whereof, I affix my signature.

ROBERT T. STEINDORF.